Patented May 3, 1949

2,468,770

UNITED STATES PATENT OFFICE 2,468,770

ROSIN-STYRENE INTERPOLYMERS

Earl D. Morris and Gerald A. Griess, Midland, Mich., assignors to The Dow Chemical Company, Midland, Mich., a corporation of Delaware No Drawing. Application March 1, 1946, Serial No. 651,378

7 Claims. (Cl. 260—23)

This invention relates to interpolymers of rosin, styrene, and alpha-methyl styrene, and to related interpolymers, all useful as varnish resins, and to methods of making them.

The resinous copolymers of rosin and styrene are known materials, and have been used to some extent in the coatings field. However, they are for the most part not as soluble in aliphatic solvents, nor as compatible with common varnish ingredients, as is desired for resins to be used in formulating varnishes and paints.

It has now been found that resins of improved characteristics may be prepared by including a substantial proportion of alpha-methyl styrene or a derivative thereof in mixtures of rosin and styrene or a styrene derivative which are being polymerized to form varnish resins. The alpha-methyl styrene or derivative appears to interpolymerize with the other constituents forming resins having the advantageous properties of the known rosin-styrene copolymers and being more soluble in mineral spirits and like aliphatic hydrocarbon solvents and more compatible with linseed and other drying oils than are such binary copolymers. The new resins also permit formulation of varnishes of greater tolerance of mineral spirits than is possible with the known copolymers.

In so far as can be determined, the desirable resins of the present invention may be formed by the interpolymerization of styrene and alpha-methyl styrene or their derivatives with rosin, either in the crude state or in purified form as abietic acid. The ordinary gum rosin of commerce, and crude gum rosins containing turpentine, are preferred.

The styrene component of the new interpolymers is usually styrene itself, although polymerizable nuclear monovinyl aromatic compounds in general, e. g. o- and p-methyl styrene, o- and p-ethyl styrene, o-p-dimethyl styrene, p-chlorostyrene, p-methoxy styrene, and vinyl naphthalene, may be employed.

Likewise, the alpha-methyl styrene component of the resins is ordinarily alpha-methyl styrene itself. However, other alpha-methylene-lower-alkyl aromatic compounds wherein the alpha-methylene-lower alkyl group contains not over 4 carbon atoms, e. g. p-methyl alpha-methyl styrene, alpha-ethyl styrene, and p-chloro alpha-methyl styrene, may be used.

To produce useful varnish resins, the rosin or rosin derivative should ordinarily represent from about 20 to about 80 per cent by weight of the mixture to be interpolymerized, with the styrene and alpha-methyl styrene or their derivatives making up the remaining 80 to 20 per cent. The latter two components should preferably be present in such relative proportions that the styrene or other monovinyl compound makes up from about 50 to about 80 per cent by weight of the total of these components. Optimum properties have been obtained with the interpolymers of from about 60 to about 80 per cent by weight of rosin and correspondingly from about 40 to about 20 per cent of a mixture of styrene with alpha-methyl styrene or p-methyl-alpha-methyl styrene, such mixture containing about 70 per cent of styrene.

In one method of making the new resins, the rosin, styrene, and alpha-methyl styrene, or their derivatives, are simply mixed together in the desired proportions and the mixture is heated at an elevated temperature until polymerization is substantially complete, usually in 48 hours or less at temperatures above 150° C. Most rapid reaction rates are obtained when the mixture is heated at a temperature sufficient to cause it to boil gently in a vessel provided with a reflux condenser. If the rosin used contains water, the latter will appear in the reflux liquid, and should be separated out to avoid returning it to the vessel. When the reaction is thus carried out at the boiling point, the temperature of the polymerizing mass rises gradually until a temperature of 200° to 220° C. is reached after 4 to 10 hours, at which point refluxing stops. Heating may be continued for several hours more to insure complete polymerization.

If desired, the rate of interpolymerization may be increased somewhat by incorporating in the mixture a small proportion, e. g. 0.5 to 3 per cent by weight, of a peroxide polymerization catalyst, such as benzoyl peroxide, acetyl benzoyl peroxide, tertiary butyl perbenzoate, or tertiary butyl hydroperoxide. The use of these catalysts has the further advantage of making resins with good solubility characteristics over wider ranges of proportions than is possible without a catalyst.

While the interpolymers of the invention are ordinarily prepared by polymerization in bulk, they may also be produced by interpolymerizing the components in solution in an inert organic solvent, such as diethyl benzene, or in aqueous emulsion.

The interpolymers produced according to the processes just described are clear resins which are freely soluble in aromatic solvents and of good solubility in aliphatic solvents.

On heating with drying oils and polyhydric alcohols, they form varnishes of high gloss, rapid drying time, and good hardness and durability. They are of particular value in formulating architectural finishes.

If it is desired to increase the oil solubility of the new resins somewhat, the interpolymerization may be carried out in the presence of a small proportion of a drying oil, such as tung oil or linseed oil. To this end, the mixture to be polymerized should ordinarily contain from about 20 to about 80 parts of rosin or a rosin derivative, from about 80 to about 20 parts of a mixture of styrene and alpha-methyl styrene or their derivatives containing from 50 to 80 per cent of the styrene component, and from about 1 to about 15 parts of the drying oil. Polymerization is carried out according to the procedure previously described.

The following examples will serve to illustrate the invention but are not to be construed as limiting its scope.

Example 1

A charge of 75 parts by weight of w. w. gum rosin, 17.5 parts of styrene, and 7.5 parts of alpha-methyl styrene was heated under reflux at a temperature rising from 100° C. to 200° C. during 4 hours, after which it was further heated at 200° C for 12 hours. The product was a pale yellow resin having a melting point of about 135° F., as determined by the heated bar method.

A 50 per cent by weight solution of the resin in toluene exhibited a color (Gardner) of 8-9. A 70 per cent solution in toluene had a viscosity (Gardner-Holdt) of H-I.

Example 2

The process of Example 1 was repeated except that instead of gum rosin there was used Nelio resin (a crude rosin containing 15 to 20 per cent of turpentine). After polymerization, the product was blown with steam to remove the turpentine impurity. The resulting material was a yellow resin having a melting point of about 148° F.

Example 3

A charge of 1200 pounds of w. w. gum rosin, 420 pounds of styrene, and 180 pounds of alpha-methyl styrene was heated under reflux at a temperature rising to 200° C. in 4 hours, after which heating was continued for 19 hours at 200° C. During the early stages of the process, 4.6 pounds of water distilled off and was removed from the system. The product had a melting point of 132° F. and an acid number of 110. A 50 per cent solution in toluene exhibited a color of 8-9 (Gardner). A 70 per cent solution in toluene had a viscosity of U-V (Gardner-Holdt).

Example 4

A charge of 50 parts of w. w. gum rosin, 35 parts of styrene, 15 parts of alpha-methyl styrene and 1.0 parts of benzoyl peroxide catalyst was heated at 150° C. for 24 hours and at 200° C. for an additional 24 hours. The product was a brittle clear yellowish resin.

Example 5

A charge of 25 parts of w. w. gum rosin, 52.5 parts of styrene, 22.5 parts of p-methyl alpha-methyl styrene, and 1.0 part of tertiary butyl hydroperoxide was heated according to the schedule of Example 3. The product was a clear light-yellow brittle resin.

Example 6

A charge of 75 parts of w. w. gum rosin, 14.9 parts of styrene, 6.3 parts of alpha-methyl styrene, and 3.8 parts of tung oil was heated according to the schedule of Example 3. The product was a clear yellow brittle resin, compatible with linseed oil.

What is claimed is:

1. The interpolymer of (1) from 20 to 80 percent by weight of rosin and (2) from 80 to 20 percent of a mixture of a polymerizable nuclear monovinyl aromatic compound and a nuclear alpha-methylene-lower alkyl aromatic compound wherein the alpha-methylene-lower alkyl group contains from 3 to 4 carbon atoms in which the said monovinyl compound represents from 50 to 80 percent by weight of such mixture, the interpolymer having been prepared by heating the components together at a temperature above 150° C. but not exceeding the refluxing temperature of the polymerizing mass.

2. The interpolymer of from 20 to 80 percent by weight of rosin and correspondingly from 80 to 20 percent of a mixture of styrene and alpha-methyl styrene in which the styrene represents from 50 to 80 percent by weight of such mixture, the interpolymer having been prepared by heating the components together at a temperature above 150° C. but not exceeding the refluxing temperature of the polymerizing mass.

3. The interpolymer of from 60 to 80 percent by weight of rosin and correspondingly from 40 to 20 percent of a mixture of styrene and alpha-methyl styrene containing about 70 percent of styrene, the interpolymer having been prepared by heating the components together at a temperature above 150° C. but not exceeding the refluxing temperature of the polymerizing mass.

4. The interpolymer of from 20 to 80 percent by weight of rosin and correspondingly from 80 to 20 percent by weight of a mixture of styrene and paramethyl-alpha-methyl styrene containing about 70 percent of styrene, the interpolymer having been prepared by heating the components together at a temperature above 150° C. but not exceeding the refluxing temperature of the polymerizing mass.

5. The interpolymer of (1) from 20 to 80 parts by weight of rosin, (2) from 80 to 20 parts of a mixture of a polymerizable nuclear monovinyl aromatic compound and a nuclear alpha-methylene-lower alkyl aromatic compound wherein the alpha-methylene-lower alkyl group contains from three to four carbon atoms in which the said monovinyl compound represents from 50 to 80 percent by weight of such mixture, and (3) from 1 to 15 parts by weight of a drying oil, the interpolymer having been prepared by heating the components together at a temperature above 150° C. but not exceeding the refluxing temperature of the polymerizing mass.

6. The method of making a varnish resin which comprises heating a mixture of from 20 to 80 percent by weight of rosin and from 80 to 20 percent of a mixture of a polymerizable nuclear monovinyl aromatic compound and a nuclear alpha-methylene-lower alkyl aromatic compound wherein the alpha-methylene-lower alkyl group contains from three to four carbon atoms in which the said monovinyl compound represents from 50 to 80 percent by weight of such mixture at an elevated temperature above 150° C. but not exceeding the refluxing temperature of the polymerizing mass for a time sufficient to effect polymerization.

7. The method of making a varnish resin which comprises heating a mixture of from 60 to 80 percent by weight of rosin and correspondingly from 40 to 20 percent of a mixture of styrene and alpha-methyl styrene containing about 70 percent of styrene at a refluxing temperature until polymerization is substantially complete.

EARL D. MORRIS.
GERALD A. GRIESS.

REFERENCES CITED

The following references are of record in the file of this patent:

UNITED STATES PATENTS

| Number | Name | Date |
|---|---|---|
| 1,942,531 | Barrett | Jan. 9, 1934 |
| 1,975,959 | Lawson et al. | Oct. 9, 1934 |
| 2,215,569 | Standley et al. | Sept. 24, 1940 |

OTHER REFERENCES

"Protective and Decorative Coating," edited by Mattielo, pub. 1945 by U. S. Govt. Printing Office, page 42. Copy in Div. 50.